United States Patent
Kwok et al.

(10) Patent No.: US 6,950,878 B2
(45) Date of Patent: Sep. 27, 2005

(54) METHOD AND APPARATUS FOR PERFORMING A SOFTWARE UPGRADE OF A ROUTER WHILE THE ROUTER IS ONLINE

(75) Inventors: Raymond Wai-man Kwok, Cupertino, CA (US); Larry Albert Klein, Sunnyvale, CA (US); Sriram Vaidyanathan, Santa Clara, CA (US)

(73) Assignee: Pluris, Inc., Cupertino, CA (US)

( * ) Notice: Subject to any disclaimer, the term of this patent is extended or adjusted under 35 U.S.C. 154(b) by 31 days.

(21) Appl. No.: 10/387,153

(22) Filed: Mar. 11, 2003

(65) Prior Publication Data

US 2003/0177209 A1 Sep. 18, 2003

Related U.S. Application Data

(63) Continuation of application No. 09/947,285, filed on Sep. 5, 2001, now Pat. No. 6,535,924.

(51) Int. Cl.[7] .............................................. G06F 15/16
(52) U.S. Cl. ..................................................... 709/242
(58) Field of Search ............................... 709/242, 237, 709/238, 220

(56) References Cited

U.S. PATENT DOCUMENTS

| | | | | |
|---|---|---|---|---|
| 5,155,837 A | * | 10/1992 | Liu et al. ................... 709/221 |
| 5,727,002 A | * | 3/1998 | Miller et al. ................ 714/748 |
| 6,078,953 A | * | 6/2000 | Vaid et al. ................... 709/223 |
| 6,094,525 A | * | 7/2000 | Perlman et al. ............. 709/245 |
| 6,154,878 A | * | 11/2000 | Saboff ......................... 717/173 |
| 6,240,463 B1 | * | 5/2001 | Benmohamed et al. ..... 709/238 |
| 6,397,385 B1 | * | 5/2002 | Kravitz ........................ 717/173 |

OTHER PUBLICATIONS

U.S. Appl. No. 09/947,385, Kwok et al.

* cited by examiner

*Primary Examiner*—David Y. Eng
(74) *Attorney, Agent, or Firm*—Donald R. Boys; Central Coast Patent Agency, Inc.

(57) ABSTRACT

A method for performing an in-service software upgrade to a data router follows steps of (a) providing a source node hosting an upgrade software package; (b) causing an upgrade command to be executed; (c) establishing, as a result of the upgrade command, a network session between the data router and the source node; (d) receiving the upgrade software at the router; (e) copying and distributing, within the router, the upgrade software to designated components slated for upgrade; (f) designating one or more components in the router as backups for each component to be upgraded; (g) backing up services and software running on each target element to be upgraded to designated backup element or elements while upgrade proceeds for the target element; (h) causing a switchover at the target element to the new software; and (i) repeating steps (g) and (h) until all the components slated for upgrade are upgraded.

39 Claims, 4 Drawing Sheets

METHOD AND APPARATUS FOR PERFORMING A SOFTWARE UPGRADE OF A ROUTER WHILE THE ROUTER IS ONLINE

CROSS-REFERENCE TO RELATED DOCUMENTS

The present application is a continuation application of patent application Ser. No. 09/947,285, which was filed on Sep. 5, 2001 now U.S. Pat. No. 6,535,924, and which is incorporated herein in its entirety by reference.

FIELD OF THE INVENTION

The present invention is in the field of data-packet-routing over data-packet-networks, in particularly the hardware and software comprising a data packet router. The invention pertains particularly to methods and apparatus for upgrading software running on a data router while the router remains online and operational.

BACKGROUND OF THE INVENTION

At the time of the present patent application demand for increased data capacity and efficiency in Internet traffic continues to increase dramatically as more individuals and businesses increase their use of the Internet. The ever-increasing demand also drives development of equipment for use on the Internet such as data packet routers. A number of enterprises are now developing routers that are capable of faster and higher-capacity handling of data packets routed over the Internet.

The Internet, operating globally, comprises components from a wide variety of manufacturers. It is, of course, necessary that such equipment conform to certain hardware, software and connection standards, and operate by certain data transfer standards and protocols. These standards are all well-known to the skilled artisan.

As new and better equipment for routing data traffic in the Internet continues to be developed, researchers developing such equipment are endeavoring to include such as fault tolerance, diagnostic capabilities, and redundancy into the equipment, links between instances of routing equipment, and in implementation of routing protocols.

One of the important developments in Internet technology as of the time of filing of the present patent application is in development of faster and scalable routers utilizing a distributive-processor concept. The present inventors, for example, are involved in development of what are known in the art as Terabit routers, capable of much higher packet transfer rates than for routers currently available in the art. These routers are scalable to higher and higher overall data-transfer rates and capacity, by allowing upwards of seven thousand interfaces to network traffic.

An example of a Terabit router as known to the inventor comprises three types of processor-equipped cards adapted for controlling and routing data. Each card has it's own processor lending to a relatively newer concept of distributive-processor data routers. The three types of cards are control cards, line cards, and fabric cards. Generally speaking, a line card functions as an interface for the internal network of the router and the external network to which the router connects. Data packets entering and exiting the Terabit router typically do so through a line card. Fabric cards are a part of an internal data-routing fabric or network of the data router. Fabric cards act as individual routing points within the data router. Control cards are responsible for controlling both line and fabric cards in terms of their functions including initiating routing protocols, maintenance, special processing, control-message distribution, and so on.

In the prior art, most routers use a single processor for the processing of data packets. Some routers use more than one processor, however the number of processors is relatively small compared to a distributive data router as known to the inventor. When a data router of the prior art needs updating with new software such as newer versions of routing protocols, configuration software, or the like, the router being upgraded must be shut down and taken off line in order to perform the upgrade. After the upgrade is complete, the router must be re-booted to again join the network topology with its peers.

With efficiency of data routing in mind, it is clear that the loss of a router during upgrade procedures affects network performance through the particular portion of the network occupied by the router. Data must be re-routed through peer routers on to its destination, sometimes taking a much longer or even more constricted path or paths. It is desirable, however, that data packets be routed efficiently through a given network and connected routers at all times. Taking one or more routers down for upgrade can be a major inconvenience. The nature of a distributive router as known to the inventor provides processor architecture that may be treated differently than its single-processor counterparts where upgrading is concerned.

What is clearly needed is a method and apparatus for enabling a software upgrade to be applied to a distributive-processor data router without having to take the entire router off-line and without significant performance degradation during upgrade. A system such as this would enable, in most cases, automated upgrade of data routing protocol revisions, configuration changes and the like.

SUMMARY OF THE INVENTION

In a preferred embodiment of the present invention a method for performing an in-service software upgrade to a data router comprising steps of (a) providing a source node hosting an upgrade software package; (b) causing an upgrade command to be executed; (c) establishing, as a result of the upgrade command, a network session between the data router and the source node; (d) receiving the upgrade software at the router; (e) copying and distributing, within the router, the upgrade software to designated components slated for upgrade; (f) designating one or more components in the router as backups for each component to be upgraded; (g) backing up services and software running on each target element to be upgraded to designated backup element or elements while upgrade proceeds for the target element; (h) causing a switchover at the target element to the new software; and (i) repeating steps (g) and (h) until all the components slated for upgrade are upgraded.

In some embodiments the data-packet-network is the Internet network. Also in some embodiments, in step (a), the source location node is an FTP server and the upgrade software package is stored in memory of the server. In other cases the source location node may be a PCMCIA flash card installed in a network-connected computer, the upgrade software package residing on the card. In some embodiments the source location node may be a PCMCIA flash system residing within the router, the upgrade software package residing in the flash system.

In some cases execution of the upgrade command is manual and initiated by a user, while in other cases execution of the upgrade command is automated and triggered at a pre-set time. In some cases data network session is conducted over an Ethernet network between the source location node and the receiving component of the router. The location node may be an FTP server and the receiving router component may be a primary control card. In other cases the source location node is a personal computer. In some cases the data network session is conducted over the internet network between source location node and the receiving component for the router.

In some embodiments receiving the upgrade software comes after access and request by the router receiving component, while in other embodiments receiving the upgrade software comes after access and request sent to the router receiving component. Designated elements for upgrade may include control cards, line cards, or fabric cards.

In some cases the switchover command is automatic and executed after a certain period of time, while in other cases the switchover command is pre-configured to execute at a future designated time, the switchover managed by the primary receiving component of the router. In some cases notification of upgrade status is conducted in a separate and future data session. In some embodiments backup designations are made according to an algorithm for maximizing performance during the upgrade process.

In another aspect of the invention a system for upgrading a data router while the router is forwarding data packets over a data-packet-network is provided, comprising a node having access to the router by data link, a software upgrade package stored in memory residing in or connected to the node, a component residing in the router having access to the node over the data link, and a user station having access to the router for displaying upgrade status and results. The system is characterized in that at a specified time, the router component is caused to have access to the software upgrade package, receives and makes copies of image portions of the package, distributes the image portions to router elements within the router identified as targeted for upgrade, backs up functions of targeted elements to designated backup elements, and wherein the targeted elements each install their received image portion, reboot using the new image portion, and report back to the router component, which in turn reports status to the user station.

In some embodiments elements are upgraded in groups. Also in some embodiments backups are designated according to an algorithm for maximizing performance during the upgrade process. The data packet network may be the Internet network.

In some cases the node having access to the data router is an FTP server, and in some cases may be a personal computer. The data link may be an Ethernet network link.

In some cases the memory hosting the software upgrade package is PCMCIA flash memory, and in some the element residing in the router is a primary control card. In other cases the element residing in the router may be a line card. The user station can be a personal computer. In some embodiments the upgrade package includes image portions for control cards, line cards, and fabric cards.

In another aspect of the invention a router upgrade application for upgrading at least one targeted computerized element of a router is provided, comprising at least one runtime image, the image including parameters for element boot and operation once booted, an executable command for initiating the upgrade application including distribution and install, and an executable command for applying the at least one runtime image including boot directory reset and reboot instructions. The application is characterized in that the upgrade application functions automatically after a pre-determined or user selected time in cooperation with a primary router element to effect upgrade and reboot to all of the designated target elements of the router.

In some embodiments of the router upgrade application the computerized element comprises one of a control card, a line card, or a fabric card. In preferred embodiments the upgrade occurs while the router is forwarding data over a data-packet-network, and the data-packet-network may be the Internet network.

In some embodiments the initiation command is automatically executed according to a pre-determined time, and in others the apply command is automatically executed according to a pre-determined time.

There may be multiple backup router elements to assume the operational responsibilities of a target element being upgraded, and there may be a backup router element to assume the operational responsibilities of multiple target elements being upgraded simultaneously. In some cases targeted elements include cards of different types, and elements are upgraded in groups by type.

In embodiments of the invention described in enabling detail below, for the first time a system and method is provided wherein computerized machines, such as routers, may be upgraded while they continue to perform their on-line functions.

BRIEF DESCRIPTION OF THE DRAWING FIGURES

DESCRIPTION OF THE PREFERRED EMBODIMENTS

Figure 1:
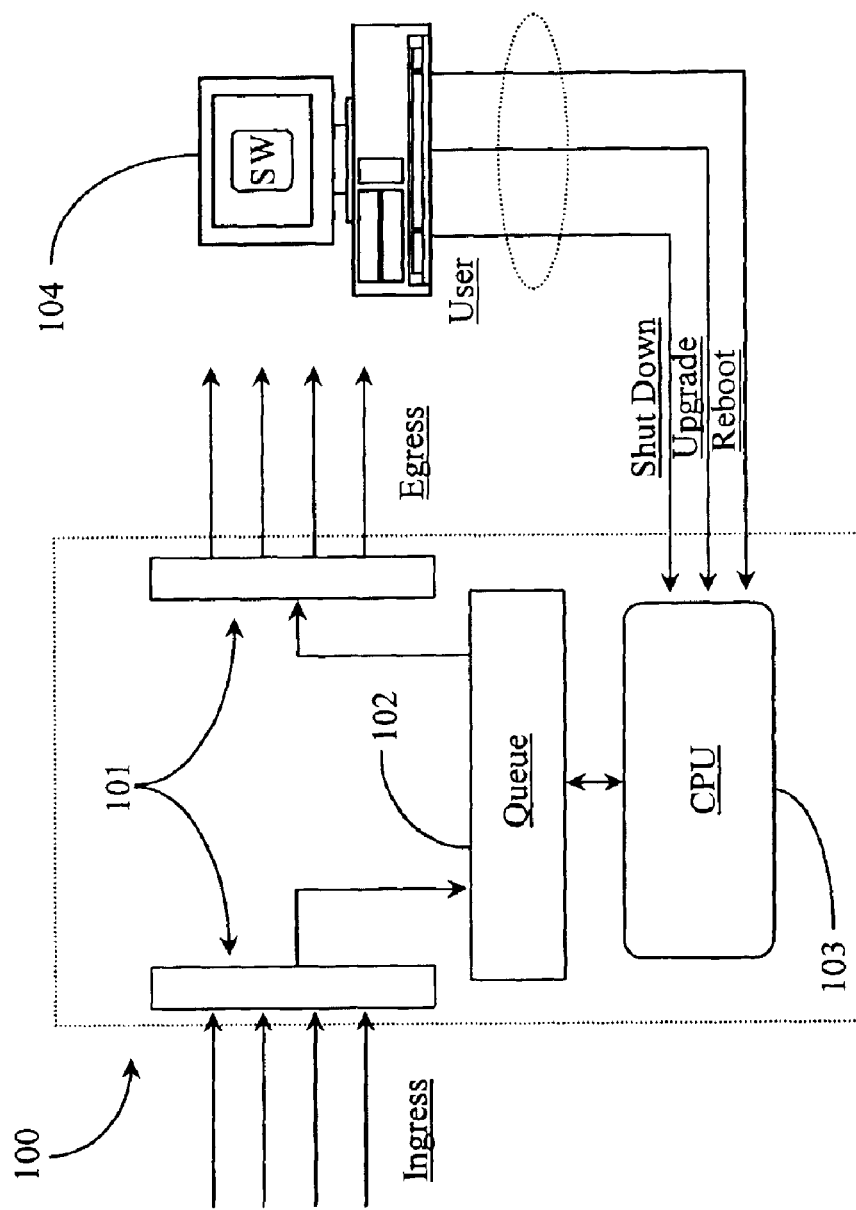
FIG. 1 is a block diagram illustrating an upgrade of a data router according to prior art.

FIG. 1 is a block diagram illustrating an upgrade process for a data router 100 according to prior art. Router 100 represents a prior-art data router as was described with reference to the background section of this specification. Router 100 comprises a computer processing unit (CPU) 103, a data queue 102 for temporarily storing packets before they are forwarded, and at least one ingress/egress interface 101.

Interfaces 101 illustrated within router 100 are labeled one as an ingress interface and the other an egress interface for illustrative purpose only. In actual practice, each interface 101 handles both incoming and outgoing data traffic, although ingress and egress are treated differently in the router. CPU 103 processes data packets for forwarding as is known in the art.

Data packets arriving through ingress of router 100 are placed in queue 102. CPU 103 performs the required data processing associated with those packets while they are in queue. After processing is complete data packets are downloaded from queue 102 and sent out through egress of router 100. CPU 103 is also responsible for managing routing protocols, error messaging, and any special processing.

A user 104 (PC icon) is illustrated in this prior-art example as having administrative control over router 100 via a network control line, logically illustrated herein as three physical paths. User 104 will typically use a powerful computer in order to upgrade router 100 with new software periodically or whenever required. An instance of software (SW) illustrated on a graphical user interface (GUI) of user-PC 104 in this example represents upgrade software that would be used to upgrade router 100 in this example.

Because router 100 has a single CPU 103 for processing all data packets that are forwarded therethrough, user 104 must first shut down router 100 before performing a major software upgrade. This is illustrated by physical portion of the described network control line labeled Shut Down. The above-described label represents a first command sent to CPU 103 from user 104.

At this point router 100 is off-line and ready to accept an upgrade. Typically interface protocols in the network will notice the absence of router 100 in the topology, and compensate by upgrading routing tables and the like. While router 100 is down, user 104 initiates and installs the upgrade represented by the path labeled Upgrade. After the software upgrade is successfully installed within router 100, user 104 executes a reboot command, illustrated herein by the path labeled Reboot.

Router 100 must remain off-line during the entire upgrade process. In a case where router 100 might have more than one CPU 103 sharing processing responsibility, a significant portion of work contributed by router 100 to a network is still lost temporarily due to the upgrade process.

Figure 2:
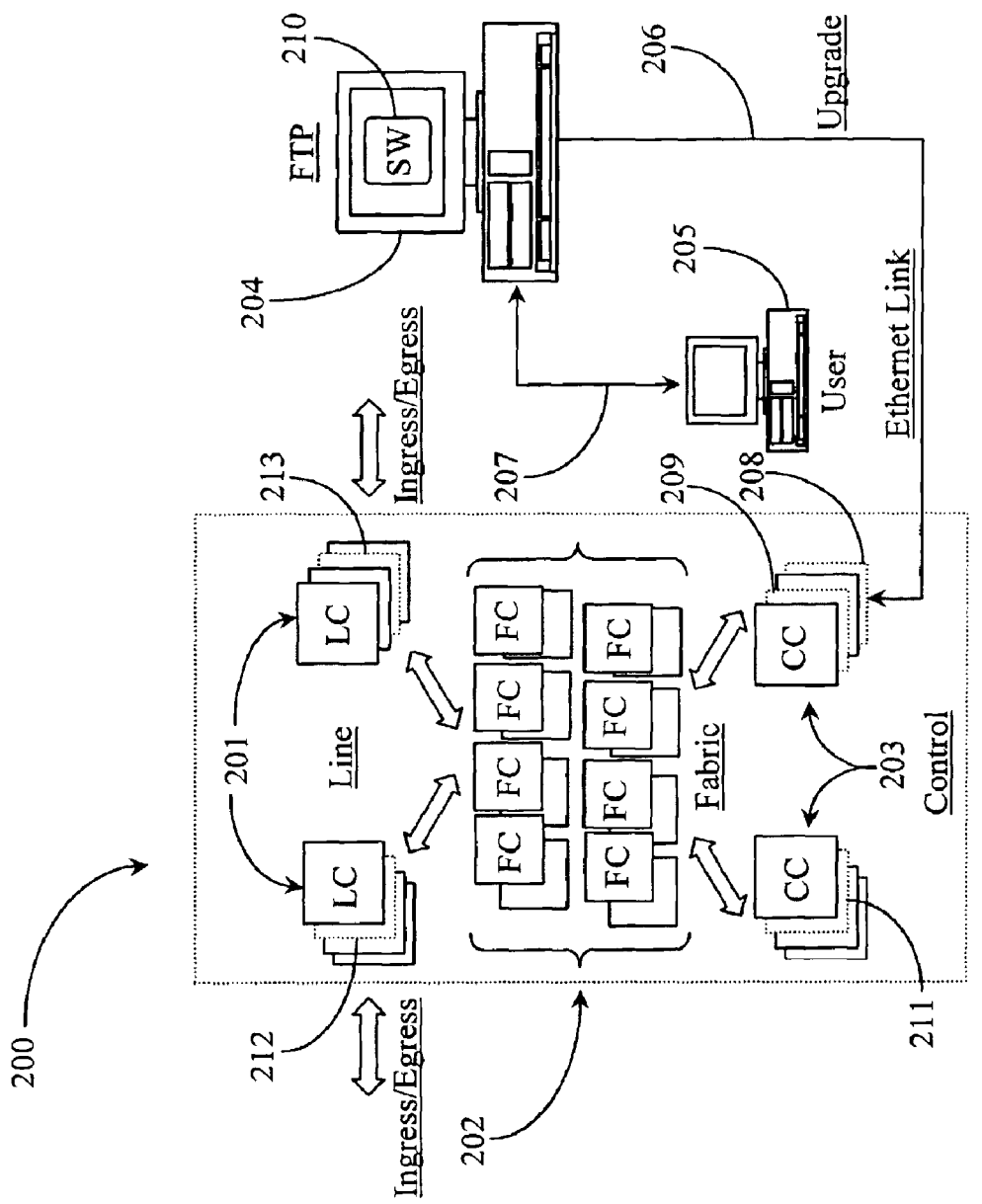
FIG. 2 is a block diagram illustrating an upgrade of a distributed-processor router according to an embodiment of the present invention.

FIG. 2 is a block diagram illustrating an upgrade of a distributed-processor router 200 according to an embodiment of the present invention. Router 200 represents a state-of-the-art data router as known to the inventor, wherein processing and data-handling responsibility is distributed in the form of computerized router cards. As was described in the background section of this specification, the computerized cards utilized within router 200 include three categories or types of cards in this example, these being control cards, fabric cards, and line cards. The line cards are illustrated in this embodiment as element # 201. Line cards (LC) 201 comprise the interfacing components between the external network to which router 200 connects and an internal network for routing data within the router itself.

Router 200 has, in this case, 2 Ingress/Egress interfaces represented herein by horizontally placed double-arrows associated with either of the two illustrated groups of line cards 201. It is noted here that each line card may have a plurality of actual ingress/egress ports. In this embodiment there are eight line cards 201, however there may be many more or fewer line cards 201 installed in router 200 without departing the spirit of the present invention. It is noted herein also, that the arrangement and groupings of line cards 201 in this embodiment is logical only does not represent actual implementation of line cards 201 within router 200.

Router 200 further comprises a plurality of fabric cards (FC) 202 implemented therein and adapted, through interconnected paths, as an internal data network within router 200. Each one of fabric cards 202 comprises a node or hop within the internal fabric of router 200. In this example there are 16 fabric cards illustrated, however there may be many more or fewer fabric cards 202 without departing from the spirit and scope of the present invention. It is noted herein that the arrangement and groupings of fabric cards 202 in this example is logical only and does not represent actual physical implementation.

Router 200 further has a plurality of control cards (CC) 203 implemented therein and adapted to overall control of the router and its elements. Control cards 203 support, for example, routing protocol software used by router 200, manage error and control messaging, perform special processing, and so on. It is noted herein, that the particular arrangement and groupings of control cards 203 in this example is logical only and does not represent actual physical implementation.

Line cards 201, fabric cards 202 and control cards 203 makeup the internal processing power of router 200 implemented in a distributed fashion. Because of this distributed architecture wherein all of these cards are interconnected, failure of some of these described processing components can occur without seriously affecting the performance of router 200 in the routing of data packets. Line cards 201 comprise the external interfaces of router 200, fabric cards 202 comprise the internal network of router 200 and control cards 203 comprise the controlling components of router 200.

As previously described above, each card within router 200 has an onboard processor. Each card also has a queue system and a plurality of ingress/egress ports. Therefore, upgrade procedures to router 200 according to embodiments of the invention may take the form of various configurations. For example, an upgrade procedure may target a single, a number of, or all of the cards within router 200 that are of a same type. In one embodiment, an upgrade procedure may target specific ones of all of the types of cards within router 200. In still another embodiment, an upgrade procedure may target all of the cards operational within router 200.

The upgrade procedure of the present invention provides for designating backup cards to handle the duties of targeted cards while the targeted cards are being upgraded. Within the illustrated group of line cards 201 in router 200, there are two line cards represented by a dotted border and given the element numbers 212 and 213 respectively. For the purpose of discussion, one of these cards can be designated as a backup card while the other is designated as a target card for upgrade. Within the illustrated group of control cards 203 in router 200, there are three control cards represented by a dotted border and given element numbers 208,209, and 211 respectively. For the purpose of discussion, one of these cards, card 208 in this example, is designated as a global master control card (GMCC). Control card 209 may be a target card for upgrade, and control card 211 may be a designated backup card.

It should be noted the there doesn't need to be a 1 to 1 relationship between target cards and backup cards. It is essentially running services that are backed up. These services may run on any card or on multiple cards. For example, all target services running on card 209 may be distributed to card 211 and 208.

The relationship between designations as target, backup, and GMCC are described further below.

A file transfer protocol node (FTP) 204, illustrated herein as a PC icon, is provided in this embodiment as a network source for software required to upgrade one or more of the components of router 200. The upgrade software is illustrated in this embodiment as SW 210 residing on or accessible to node 204. Representation of SW 210 on a GUI of node 204 is logical only for the purpose of illustration. In actual practice, FTP 204 may not have a GUI interface or display. A user 205, illustrated herein as a PC icon, has a connection to GMCC 208, which may be accomplished in any one of several ways. For example, this connection may be connection to Ethernet link 206 via alternative path 214, or directly by an alternative path 215. The path of connection is not limiting to embodiments of the invention.

The router 200 has a network connection to FTP node 204 from which it requests and receives the software package. In one embodiment of the invention this connection may be an Internet connection. In other embodiments any data packet network connection WAN or LAN is applicable. FTP node 204 is assumed in this example to be a node maintained on the Internet network or other applicable WAN. User 205 may access the primary control card 208 for the purpose of receiving upgrade status reports, error notifications, and so on. In one embodiment, user 205 may manually intervene in the upgrade process directly to GMCC 208, FTP node 204 has a dedicated Ethernet network connection 206 to GMCC card 208. Network connection 206 in one embodiment of the invention is a high-speed network link capable of over 100 Mbit/sec data transfer rate. In this type of upgrade, one or more cards, in this case, card 208 within router 200, is configured to perform a network boot operation wherein a connection to FTP node 204 is established for the purpose of downloading SW 210 to card 208. This particular method of getting SW 210 to router 200 is not required in order to practice the present invention. In one embodiment, SW 210 may be distributed to card 208 from FTP node 204 via normal Internet path through one of line cards 201. In this case, SW 210 would have to be distributed through fabric 202 to card 208. Using a separate Ethernet connection is simply a convenience. In another embodiment, SW 210 may be flashed in from a PCMCIA card on a network-connected computer. There are many possibilities.

SW 210 comprises all of the software images and commands required to facilitate upgrade of each type of card within router 200. For example, control cards 203, line cards 201, and fabric cards 202 boot from and operate according to separate images. These images are termed runtime images by the inventor using familiar object-modeling and programming language that is known in the art. The images are built specifically for the type of card that will boot and operate from them.

Each card has a memory for receiving and storing its runtime image. In one preferred embodiment the memory is flashable.

Referring again to FIG. 2, in this example, an upgrade is in process from FTP node 204 through Ethernet link 206 and GMCC 208. GMCC 208 receives all of the required software images for cards targeted for upgrade. In this example, card 209 is currently being upgraded and card 211 is the designated backup card for card 209 while the upgrade process executes. As a designated backup, card 211 assumes the operational duties of card 209 temporarily while card 209 is being upgraded. If more than one, or all of control cards 203 are to be upgraded in a single session, then designation for backup card may be rotated from card to card as required. In the case of all of control cards 203 requiring upgrade in a same session, then GMCC card 208 will be the last card to reset to the new image.

In this example, line cards 212 and 213 are currently involved in the upgrade process. Assuming that card 213 is the target card, then line card 212 will be a backup. Unlike control cards, backing up a line card is somewhat more involved because it involves re-routing incoming data that would normally use line card 213, to a new line interface or that of card 212. Line card 213 cannot send or receive data while its upgrade is being performed.

When new versions of an image controlling how the card boots and is configured are part of the upgrade process, the cards will have to perform a reboot to use the new image. A reboot is always required to utilize a new software image which may contain many software enhancements. It is the fact that existing operation of the router does not have to be affected while the system is transitioning to the new enhancements. Once the system has been upgraded, the new enhancements may be turned on and utilized.

One with skill in the art will recognize that an upgrade process as described in this specification is performed systematically when upgrading many cards. For example, no more than one or a few cards will be down for any period of time. Furthermore, the upgrade images are built so as to support the last version of the image such that a newly rebooted card may cooperate operationally with a card not yet upgraded. In this way, router 200 may continue to process and forward data packets as the upgrade procedure is running.

This example illustrates upgrade of line and control cards. In the case of fabric cards 202, there is a built-in redundancy within the fabric such that when one fabric card is down for upgrade, data destined for that card is re-routed using a next-best shortest path through the fabric that does not include the target fabric card. It is noted herein that the time period that any card is down during an upgrade is quantified by the time it takes to shut down and reboot each card and is relatively small in number of cycles. More detail regarding the upgrade process is provided below.

Figure 3:
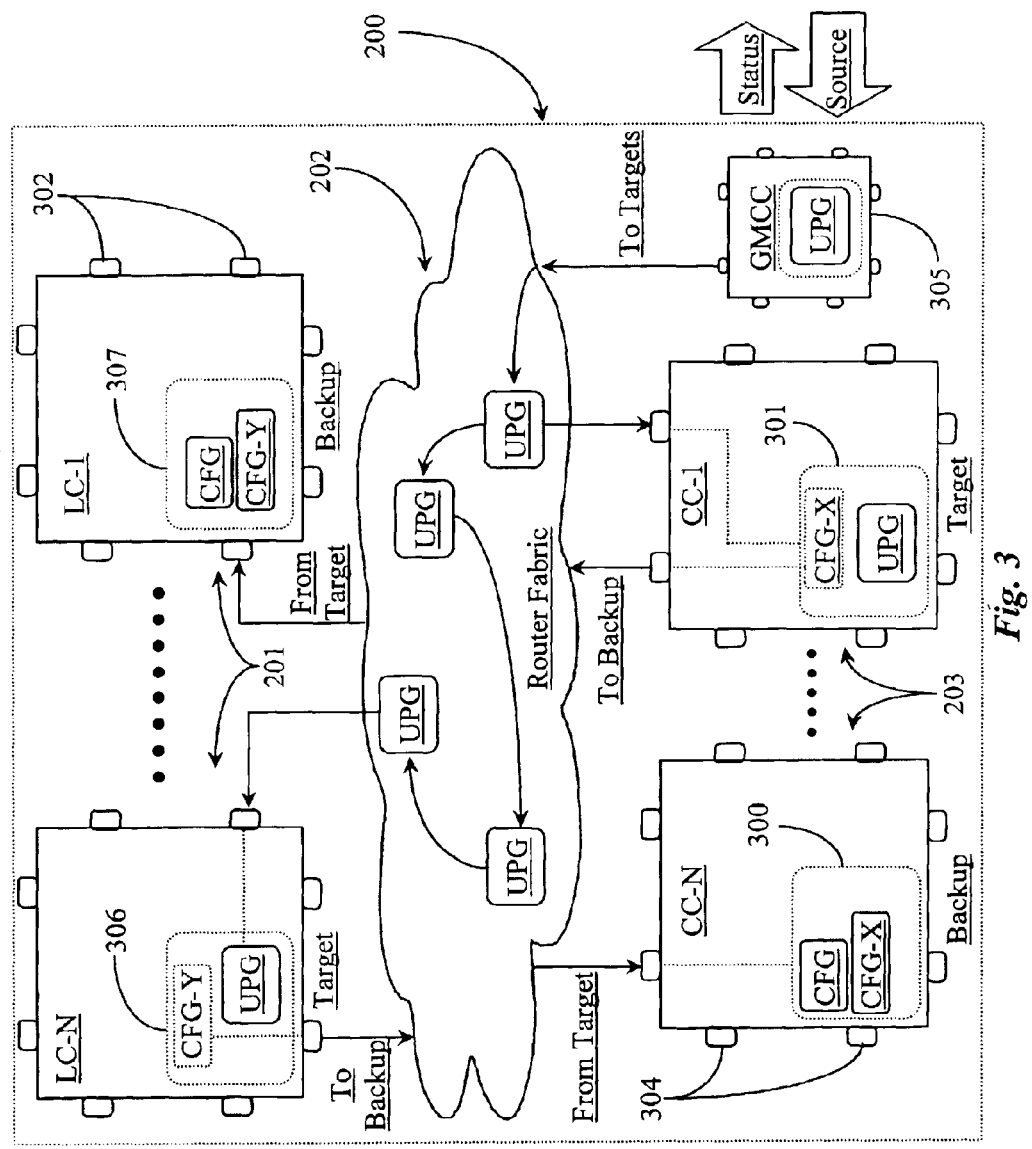
FIG. 3 is a block diagram illustrating an upgrade distribution process within the router of FIG. 2.

FIG. 3 is a block diagram illustrating an upgrade distribution process for router 200 of FIG. 2. In this example, line cards 201 and control cards 203 are illustrated in expanded detail for the purpose of clarity in description of the invention. A GMCC 305 is provided in this example as an interface to the source of the software upgrade. As was described with reference to FIG. 2 above, the external link between GMCC 305 and a software source may be an Ethernet network connection. Interaction between GMCC 305 and the software source is represented herein by block arrows, one labeled Source, which represents input from a software source and one labeled Status, which represents status data reported back to a user during and after the upgrade process. In the case of an FTP server-sourced upgrade associated with a network boot, status information concerning the progress of an upgrade, such as error reports and so on, can be accessed by a user through the user's connection to the GMCC. In another embodiment status reports may be given directly to a user if there is a dedicated network connection available established for the purpose.

In this example, line cards 201 are illustrated with a plurality of ingress/egress ports 302. In this example there are eight ports per card, however there may be more or fewer without departing from the spirit and scope of the invention. One of the illustrated line cards is labeled LC-1 and will hereinafter at times be referred to by this label. The other illustrated card is labeled LC-N and will hereinafter at times be referred to by this label. LC-1 is designated in this example as a backup line card and is so labeled. LC-N is designated in this example as a target card for upgrade as is so labeled. The protocol of 1-N is used to indicate that there may be essentially any number of line cards.

Control cards 203 are illustrated herein with a plurality of ingress/egress ports 304 similarly to that described with line cards 201. Also similar to the above description there is a designated backup control card and a target control card as is so labeled. Backup card 203 is labeled CC-N and will hereinafter at times be referred to by this label. Target card 203 is labeled CC-1 and will hereinafter at times be referred to by this label. GMCC 305 functions as the primary interfacing card between the external software source and other components of router 200.

Each illustrated card in this example has a flashable memory for storing software images. LC-N has a flash memory 306 provided therein and LC-1 has a flash memory 307 provided therein. Similarly, CC-N and CC-1 have flash memories 303 and 301 installed respectively. Each flash memory is capable of storing at least 2 complete software images. It is important to note that an existing SW image is not overwritten or erased during the upgrade process. An image table (not shown) is provided within each flash memory of each card. The table contains the image name and current state of each image on a card.

In this example, operational data stored on target cards (LC-N, CC-1) is copied to designated backups (LC-1, CC-N) before each target card is taken offline for upgrade assuming, the nature of the upgrade requires re-boot in each case. For example, CC-1 contains current runtime configuration data (CFG-X) that is specific to that card. CFG-X contains all of the pertinent data and component identifications of the components under charge of CC-1. One of these variables is the identification of line cards under control of CC-1. Identification of specific fabric cards under control of CC-1 is also a part of CFG-X. CFG-X resides or may reside in flash memory or runtime memory or both in the target card. CFG-X has enough information to allow the backup of CC-1 (CC-N) to function on behalf of CC-1 when it is offline.

GMCC 305 manages designating a backup to function on behalf of a target card and manages data-transfer operations from the target to the backup before CC-1 is taken offline to reboot. In this example, CC-N is illustrated as having it's own configuration data. (CFG) plus that of CC-1 (CFG-X). CFG-X in CC-1 is illustrated as a dotted rectangle indicating a post transfer state. CGF-X data destined for CC-N is passed through an egress port of CC-1 into the router fabric 202 as is illustrated by directional arrow labeled To Backup. After traveling through fabric 202, the data arrives at CC-N from fabric 202 as illustrated by a directional arrow labeled From Target and is written into memory. In this way CC-N is enabled to perform it's own work plus the original work performed by CC-1. CC-N, in this example has the functional responsibility of 2 cards.

In LC-1, the current configuration of CFG-Y is received and stored in memory. LC-N (target card) exhibits a dotted version of CFG-Y in order to illustrate the source. Exact assignments of target cards and dedicated backup cards depends on implementation and enterprise rules. GMCC 305 distributes the appropriate SW image to each target card. The upgrade software distribution path to both CC and LC type cards is illustrated herein as a plurality of rounded rectangle labeled UPG.

GMCC 305 distributes UPG to target cards through fabric 202 as illustrated herein by a directional arrow labeled To Targets, after designated backups are in place and operational. The UPG data is distributed to targets through fabric 202, more specifically, along paths of fabric cards to each destination. In this case the UPG destinations are CC-1 and LC-N. It will be appreciated that the UPG image for LC-N will be different than the UPG image for CC-1 because they are markedly different types of cards having different functions to perform within router 200.

In fabric 202, each UPG designation represents a hop or FC fabric card in a path of distribution. In this example, UPG image for CC-1 took only one hop through fabric 202 from GMCC 305. UPG image for LC-N takes 4 hops through fabric 202. If any UPG images are destined to fabric cards, then each card will write its own image data to onboard flash and forward that data for other cards.

Also present in each flash memory of each upgradeable card is a boot loader and a boot pointer. These components are known in the art and cooperate with the previously-described image table present on each card to designate which image will be used to reboot a card after upgrade and reset to which image will be used to next reboot the card. Only after successful booting using the new image, will an older version be erased from memory. This insures that if an upgraded image is corrupted or otherwise fails, the older image can still be used to boot the card. During the entire upgrade process, messages and responses or acknowledgements are propagated between GMCC 305 and all target cards for upgrade. Any critical error messages that would force a re-try are passed to an initiating user as indicated by the block arrow labeled Status.

It will be apparent to one with skill in the art that GMCC 305 may itself be upgraded to use a new image and will have to have a backup card to perform it's functions while it is offline. Similarly, other designated backups will have to be upgraded in a process where all or a significant number of cards need the upgrade. The multi-card upgrade process is configured to rotate backup designations as required.

In a preferred embodiment the GMCC always has a backup regardless whether it is a target card for upgrade. This ensures that the upgrade task/process itself is fault tolerant in the event that something may happen to the GMCC while the router is being upgraded. The backup GMCC will resume upgrade responsibilities in the event of a GMCC failure.

In a case where all cards of a same type in a shelf are to be upgraded, eventually upgrade cards already using the new image will serve as backups. The process is sequential and identifies each card by ID and destination address including slot number in the shelf supporting the cards. Any logical order may be followed. It is noted herein that designating and establishing backup cards to assume responsibilities of a card being upgraded in not specifically required in order to practice the present invention. Router 200 may, as previously described, lose function of one or even a few cards while still online and forwarding data with performance degradation limited to the data lost as a result of specific card downtime. However, designating and implementing backup cards provides a mechanism to maintain optimum network performance during the upgrade process.

In a preferred embodiment, any upgrade requiring reboot to a new version of SW would be performed in one session for an entire shelf of control cards, fabric cards, or line cards. This type of upgrade is termed a router-level upgrade. In one embodiment, it is also possible to perform a router-level upgrade on all of the cards contained in and operational in the router. However, some logic may be applied such as first upgrading all of the control cards, then all of the line cards, and then all of the fabric cards in a single session. The upgrade process in a preferred embodiment is entirely automatic from the point of issuing an upgrade command. The re-boot process is, in preferred embodiments, a timed function wherein the command is executed as part of the runtime image application command structure.

Figure 4:
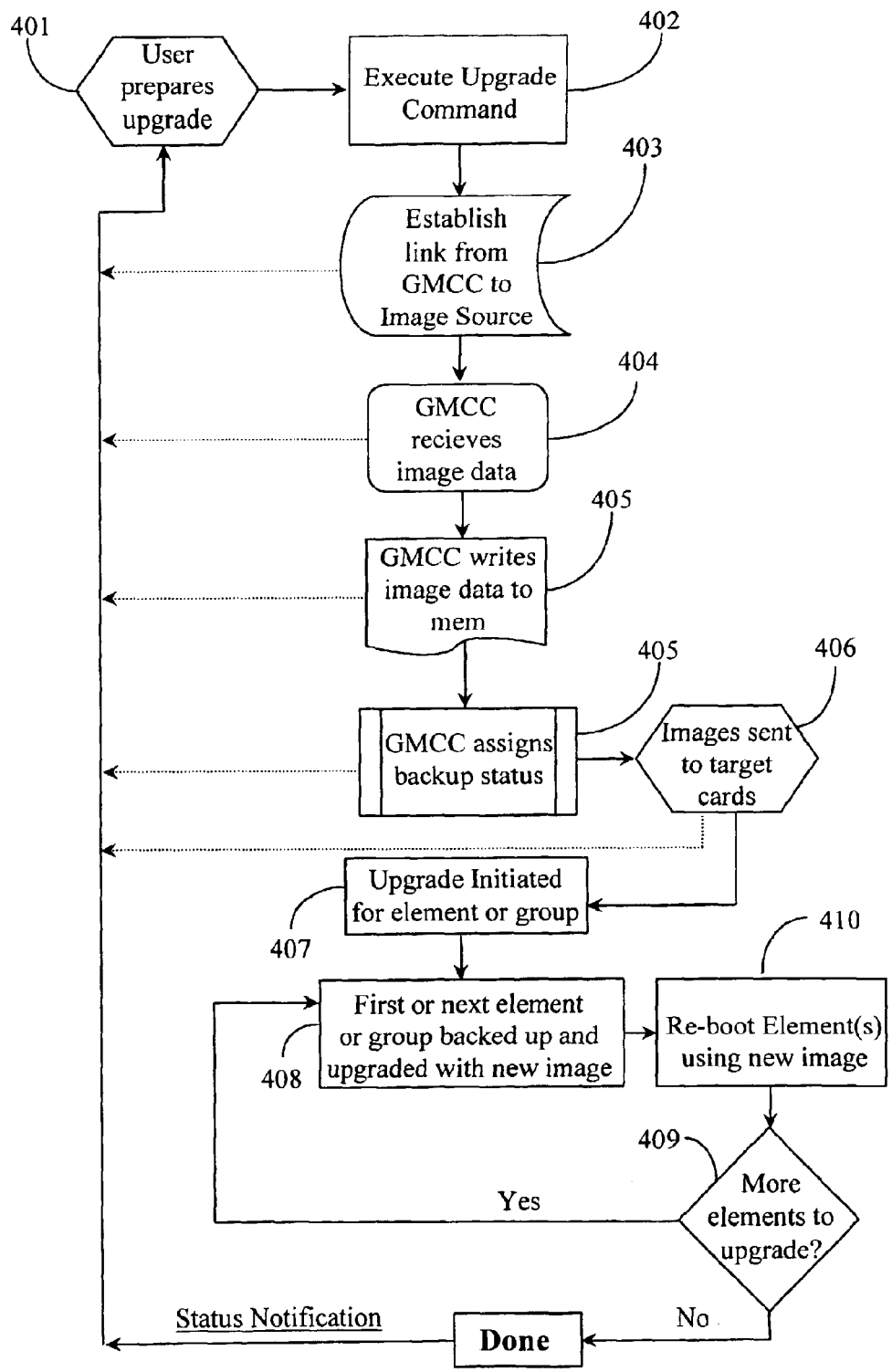
FIG. 4 is a process flow diagram illustrating steps for initiating and completing a software upgrade according to an embodiment of the present invention.

FIG. 4 is a process flow diagram illustrating steps for initiating and completing a software upgrade according to an embodiment of the present invention. At step 401, a user prepares an upgrade session. This pre-session step may include building the runtime images, configuring which cards in a router will be upgraded and so on. A user may set-up a remote FTP server with the upgrade package or a user may set up a PCMCIA Flash delivery, for example.

At step 402, an upgrade command is executed. This step includes manual execution such as by user input, or automated and timed execution such as is the case of a pre-configured network boot. In a pre-configured network boot, a designated GMCC card analogous to card 305 described with reference to FIG. 3 above would, at a pre-designated time, establish a link to a remote image source such as an FTP server. This step is illustrated herein as step 403.

In one embodiment, step 403 is a manual step initiated by a user. A remote session to upgrade a router may be conducted over an Ethernet network, or other suitable network connection, such as the Internet. In one embodiment, router upgrade sessions can be conducted over a LAN in-house. In still another embodiment, an upgrade package resides within the router itself in a common Flash memory file system. In yet another embodiment an upgrade system may work over an Internet connection from a remote location.

At step 404, a designated GMCC at the system to be upgraded receives image data comprising the upgrade runtime images to be installed. At this step, for a scalable data router, images for all three types of cards (control, line and fabric) may be received. At step 405, the GMCC writes the image data to onboard memory and begins propagating the appropriate image data to destination components (typically cards) within the router that will be upgraded. Part of this process is designating backup status for upgrade targets in step 405. A backup sequence in one embodiment is configured into the software upgrade package and is controlled by the GMCC. For example, if all of the control cards within a router are to be upgraded with a new image then the GMCC will establish the sequence for designated backups. New backup assignments are executed as individual cards complete the upgrade and reboot. Any logical order may be employed. The exact order will depend on the scope of the upgrade session.

It should be remembered that there need not be a one-to-one relationship between backup elements and elements to be upgraded. Further, some elements serving as backups, may subsequently be backed up and upgraded as well. The key to in-service upgrading is that functions of elements to be upgraded must be performed by alternate elements in the system, while the primary elements are down during upgrade.

At step 406, the appropriate image data is sent to cards (components) targeted for upgrade. It is noted herein that fabric cards may well have maximum receive and send sizes for data packets that are smaller than a complete upgrade image. Therefore, the image data propagated to target cards may be first fragmented into smaller packets and checked for errors before send. Destination cards receiving the image data perform a checksum operation on all of the fragments and the complete image after assembly.

Also part of the process in a preferred embodiment is that all target cards receiving data send acknowledgements back to the designated GMCC as to status and error. A reasonable timeout period for each target card may be initiated by the sending GMCC to wait for a response. If no response is received from a particular card then a retry may be initiated. Cards that report back that the upgrade was successful are formally upgraded and do not have to be included in a reattempt to upgrade any cards wherein the initial attempt failed for some reason.

At step 407, the upgrade process is initiated. At step 408 an element is backed up and then upgraded. This may be the first element if the upgrade process is first initiated, or any other element in the process as upgrade proceeds.

Once a complete image is loaded onto a target card, that card is ready to reboot if necessary to begin using the new image. At step 409, it is determined if there are other elements in the schedule to upgrade. If so, another element or group of elements is backed up and upgraded. If not, control proceeds to step 410 and the upgrade is complete.

It is noted that throughout the process, there is a convention for reporting any error states that may occur. This is illustrated by dotted directional arrows emanating from some of the illustrated steps and connecting with a logical line labeled Status Notification drawn from step 409 to step 401.

During a multiple card upgrade, the GMCC keeps track of all of the completed, current, and pending states so that if one or more cards do fail to accept the upgrade, a retry may be automatically initiated for just those target cards which failed initially.

The following CLI (control line interface)commands can be used to upgrade the different components.

upgrade [bootldr|image] [network<IPADDRESS><filepath>][cc|lc48|fc] [router|<shelfid>[<slotid>]][apply]

This command upgrades the bootldr or image on the card type specified with the provided arguments. The IP Address of where the image is present is specified when the image has to be retrieved over the network. This particular command configuration is valid only on control card upgrades. Filepath is the location of the software package. It may be on an FTP server or PCMCIA flash card.

The [apply] parameter specifies that the card automatically perform all of the more granular operational steps including but not limited to upgrading the boot pointer, converting a configuration database, performing a reboot using the new image, overwriting the old image after successful boot, and backup of running services and configurations, and so on.

boot network<cc_nodeid>[config parameters]

This command causes a network boot to happen on the next reboot of the target control card specified by nodeid parameter.

It will be apparent to one with skill in the art that many sub-steps may be added to the process taught above without departing from the spirit and scope of the present invention. For example, as image packets are received at a card targeted for upgrade, they are checked for errors and an acknowledgement, either positive or negative, is sent back to the GMCC each time. Also, once a full image is received and assembled, a final checksum of the entire image is performed and an acknowledgement to this effect is sent back to the GMCC. The inventor has chosen not to illustrated all of these more granular steps in order to more simply explain the upgrade process.

In one embodiment of the present invention, a mechanism is provided to enable a user to pre-specify a point in time for a router to perform an automated upgrade after a download session to distribute the upgrade images. Once the images are downloaded in to each card, the upgrade time is stored in configuration. A primary upgrade task manager will perform the rolling card resets when the specified time occurs.

In one embodiment of the invention, a network timestamp protocol (NTP) client is provided on all cards and on the designated GMCC. Using a timer function, each target card will delay reboot until the end of a self-starting time period. This prevents any cards from resetting before the apply command has executed.

In still another embodiment, cards that are introduced into a router as new cards can undergo automatic upgrade to the SW version currently in use within the router. In this implementation, special CLI commands are provided for a user to configure and specify a SW image version and its source location, perhaps at a remote server. When the upgrade task manager on a designated GMCC receives boot confirmation from a new card in the router, it compares its image version against the one stored in configuration for all of the cards. If there is a mismatch, an upgrade will be initiated to the card. It is noted herein that there should be no more than one version delta between the 2 images.

An image copy command may also be provided in one embodiment for enabling a user to overwrite the elder of the 2 images stored in flash on any card. For each image type (bootldr, runtime, fpga) there are two images stored in flash. These are designated current and other. The CLI command will be provided to allow the user to copy an image from the "current" to "other". This is useful once a new image has been qualified and the "other" can then be overwritten.

The method and apparatus of the present invention may be practiced over the Internet or other networks such as an Intranet. A WAN or LAN connection may be used as a connection from a router to an image source for an external upgrade.

In yet another embodiment, a newly inserted card that has a version of an image that is more than one or two versions older than the other cards in the router may be upgraded successively in an automatic fashion if all of the required images are available at a single source. In this embodiment, a GMCC task manager would perform an image version comparison as previously described above. Noting the existing image on the newly inserted card after boot and the number of upgrades required to attain the current image that the other cards are booting from, the GMCC can establish a session to perform the required number of upgrades until the card has the latest image.

In another aspect of the invention, the backup components are distributed based on algorithms which optimize one or both of system load and resources. In this particular embodiment no degradation in router performance will occur during the upgrade.

The method and apparatus of the invention enjoys a variety of possible configurations and implementations without departing from the spirit and scope of the present invention. Therefore, the claimed invention should be afforded the broadest possible scope under examination. The scope of the present invention is limited only by the following claims.

What is claimed is:

1. A method for performing an in-service software upgrade to a first computing machine in a network comprising steps of:

(a) providing a source node hosting an upgrade software package;

(b) causing an upgrade command to be executed;

(c) establishing, as a result of the upgrade command, a network session between the first computing machine and the source node;

(d) receiving the upgrade software at the first computing machine;

(e) copying and distributing, within the first computing machine, the upgrade software to designated first components slated for upgrade;

(f) designating one or more second components in the first computing machine as backups for each first component to be upgraded;

(g) backing up services and software running on each first component to be upgraded to a designated second component while upgrade proceeds for the associated first component;

(h) causing a switchover at the upgraded first component to the new software; and (i) repeating steps (g) and (h) until all the components slated for upgrade are upgraded.

2. The method of claim 1 wherein the is the Internet network.

3. The method of claim 1 wherein in step (a) the source node is an FTP server connected on the network and the upgrade software package is stored in memory of the FTP server.

4. The method of claim 1 wherein in step (a) the upgrade software package resides on a PCMCIA flash card in.

5. The method of claim 1 wherein in step (a) the source node is a PCMCIA flash card residing within the first computing machine, the upgrade software package residing in the flash system.

6. The method of claim 1 wherein in step (b) execution of the upgrade command is manual and initiated by a user.

7. The method of claim 1 wherein in step (b) execution of the upgrade command is automated and triggered at pre-set time.

8. The method of claim 1 wherein in step (c) the network session is conducted over an Ethernet network between the source node and the first computing machine.

9. The method of claim 8 wherein in step (c) the source node is an FTP server and first component is a primary control card of a data packet router.

10. The method of claim 9 wherein in step (c) the source node is a personal computer.

11. The method of claim 8 wherein in step (c) the network session is conducted over the Internet network between the source node and the first components.

12. The method of claim 1 wherein in step (d) receiving the upgrade software results after access and request by the first component.

13. The method of claim 1 wherein in step (d) receiving the upgrade software results after access and request sent to the first component.

14. The method of claim 1 wherein in step (e) the first computing machine is a data packet router and first components comprise control cards, line cards, or fabric cards.

15. The method of claim 1 wherein in step (f) the switchover command is automatic and executed after a certain period of time.

16. The method of claim 1 wherein in step (h) the switchover command is pre-configured to execute at a future designated time, the switchover managed by the first component of the router.

17. The method of claim 16 wherein a notification of upgrade status is conducted in a separate and future data session.

18. The method of claim 1 wherein, in step (f), backup designations are made according to an algorithm for maximizing performance during the upgrade process.

19. A system for upgrading a first computing machine while the machine is operating, comprising:

a node having access to the first computing machine by data link;

a software upgrade package stored in memory residing in or connected to the node;

a component residing in the first computing machine having access to the node over the data link; and a user station having access to the first computing machine for displaying upgrade status and results;

characterized in that at a specified time, a first component of the first computing machine is caused to have access to the software upgrade package, receives and makes copies of image portions of the package, distributes the image portions to other components within the first computing machine identified as targeted for upgrade, backs up functions of targeted components to designated backup components, and wherein the targeted components each install their received image portion, reboot using the new image portion, and report back to the first component, which in turn reports status to the user station.

20. The system of claim 19 wherein components are upgraded in groups.

21. The system of claim 19 wherein backups are designated according to an algorithm for maximizing performance during the upgrade process.

22. The system of claim 19 wherein the network is the Internet network.

23. The system of claim 19 wherein the node having access to the first computing machine is an FTP server.

24. The system of claim 19 wherein the node having access to the first computing machine is a personal computer.

25. The system of claim 19 wherein the data link comprises an Ethernet network link.

26. The system of claim 19 wherein the memory hosting the software upgrade package is PCMCIA flash memory.

27. The system of claim 19 wherein the first computing machine is a data packet router, and the component residing in the router is a primary control card.

28. The system of claim 19 wherein the component residing in the first computing machine is a line card.

29. The system of claim 19 wherein the user station is a personal computer.

30. The system of claim 27 wherein the upgrade package includes image portions for control cards, line cards, and fabric cards.

31. An upgrade application for upgrading at least one targeted computerized element of a first computing machine comprising:

at least one runtime image, the image including parameters for element boot and operation once booted;

an executable command for initiating the upgrade application including distribution and install; and an executable command for applying the at least one runtime image including boot directory reset and reboot instructions;

characterized in that the upgrade application functions automatically after a pre-determined or user-selected time in cooperation with a primary element to effect upgrade and reboot to all designated target elements of the router.

32. The upgrade application of claim 31 wherein the first computerized machine is a data packet router, and the computerized element comprises a control card, a line card, or a fabric card.

33. The upgrade application of claim 32 wherein the upgrade occurs while the router is forwarding data over a data-packet-network.

34. The router upgrade application of claim 33 wherein the data-packet-network is the Internet network.

35. The router upgrade application of claim 31 wherein the initiation command is automatically executed according to a pre-determined time.

36. The router upgrade application of claim 31 wherein the apply command is automatically executed according to a pre-determined time.

37. The system of claim 19 further comprising multiple backup components to assume the operational responsibilities of the target component being upgraded.

38. The system of claim 19 further comprising a backup element to assume the operational responsibilities of multiple target elements being upgraded simultaneously.

39. The system of claim 19 wherein targeted elements include cards of different types, and elements are upgraded in groups by type.

* * * * *

UNITED STATES PATENT AND TRADEMARK OFFICE
CERTIFICATE OF CORRECTION

PATENT NO.    : 6,950,878 B2
DATED         : September 27, 2005
INVENTOR(S)   : Raymond Wal-Man Kwok It is certified that error appears in the above-identified patent and that said Letters Patent is hereby corrected as shown below:

<u>Column 14,</u>
Lines 7-8, now reads, "The method of claim 1 wherein the is the Internet Network.", should read -- The method of claim 1 wherein the network is the Internet Network. --.

Signed and Sealed this

Fifteenth Day of November, 2005

JON W. DUDAS
*Director of the United States Patent and Trademark Office*

UNITED STATES PATENT AND TRADEMARK OFFICE
CERTIFICATE OF CORRECTION

PATENT NO. : 6,950,878 B2
APPLICATION NO. : 10/387153
DATED : September 27, 2005
INVENTOR(S) : Raymond Wai-Man Kwok et al.

Page 1 of 1

It is certified that error appears in the above-identified patent and that said Letters Patent is hereby corrected as shown below:

Col. 15, lines 38-42
Claim 31 on the patent currently reads:

31. (Previously presented) An upgrade application for upgrading at least one targeted computerized element of a first computing machine comprising:
    at least one runtime image, the image including parameters for element boot and operation once booted;
    an executable command for initiating the upgrade application including distribution and install; and
    an executable command for applying the at least one runtime image including boot directory reset and reboot instructions;
    characterized in that the upgrade application functions automatically after a pre-determined or user-selected time in cooperation with a primary element to effect upgrade and reboot to all designated target elements of the router.

Col. 15, lines 38-42
Claim 31 on the patent should read:
31. (Previously presented) An upgrade application for upgrading at least one targeted computerized element of a first computing machine comprising:
    at least one runtime image, the image including parameters for element boot and operation once booted;
    an executable command for initiating the upgrade application including distribution and install; and
    an executable command for applying the at least one runtime image including boot directory reset and reboot instructions;
    characterized in that the upgrade application functions automatically after a pre-determined or user-selected time in cooperation with a primary element to effect upgrade and reboot to all designated target elements of the computing machine.

Signed and Sealed this
Twentieth Day of March, 2012

David J. Kappos
*Director of the United States Patent and Trademark Office*